No. 785,916. PATENTED MAR. 28, 1905.
J. B. RANDALL.
TALKING BOARD.
APPLICATION FILED MAR. 18, 1904.

WITNESSES:
M. E. Verbeck
A. W. Diven

INVENTOR
Jeremiah B. Randall
BY
Eugene Diven
ATTORNEY

No. 785,916.

Patented March 28, 1905.

UNITED STATES PATENT OFFICE.

JEREMIAH B. RANDALL, OF ELMIRA, NEW YORK.

TALKING-BOARD.

SPECIFICATION forming part of Letters Patent No. 785,916, dated March 28, 1905.

Application filed March 18, 1904. Serial No. 198,752.

*To all whom it may concern:*

Be it known that I, JEREMIAH B. RANDALL, a citizen of the United States, residing at Elmira, in the county of Chemung and State of New York, have invented certain new and useful Improvements in Talking-Boards, of which the following is a specification.

My invention relates to improvements in a talking apparatus or game wherein a board provided with an alphabet, numerals, and certain signs and words is provided with a movable pointer which is moved by the involuntary action of the hands of an operator or operators in such manner as to point to certain of the figures, letters, &c., to spell out or indicate communications in answer to questions or otherwise.

My object is to provide a simple and effective apparatus of this nature in which the board displaying the alphabet, numerals, &c., will be moved by the action of the hands back and forth upon a stationary base to effect the movements of a pointer pivoted upon the movable board, to limit said board to a reciprocating motion in one line of movement only, and to mount said board on ball-bearings, whereby it may be operated effectively under slight influences to determine with precision the answers pointed out.

I attain my object by means of the arrangement and construction of the parts as illustrated in the accompanying drawings, in which—

Figure 1:
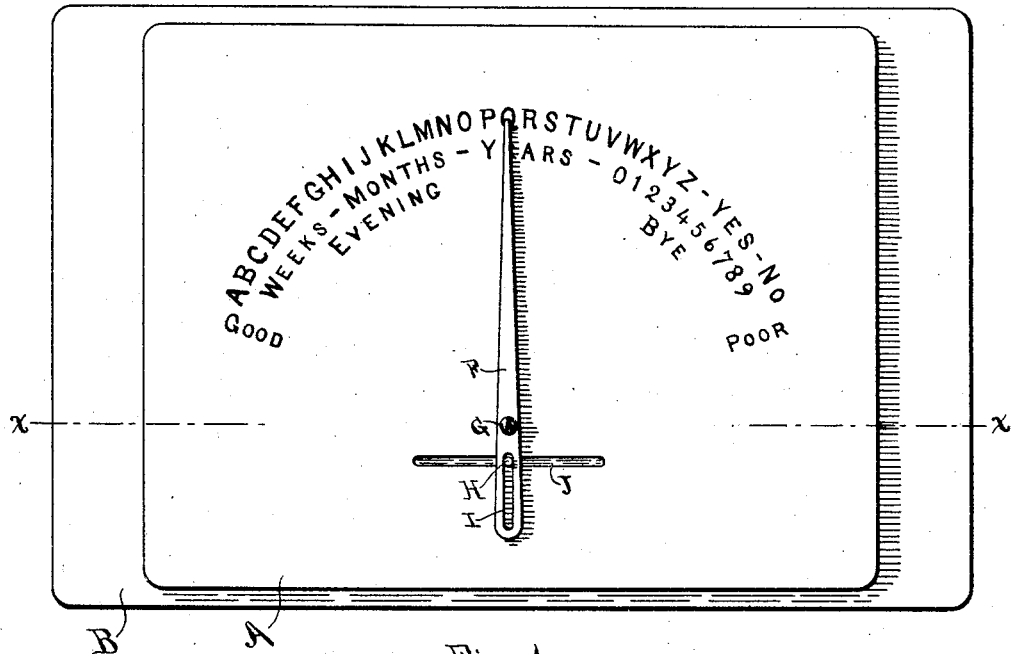
Figure 2:
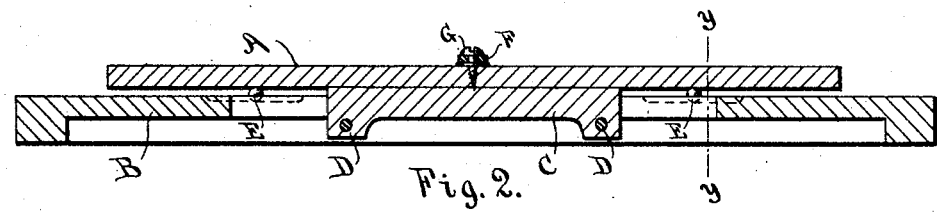
Figure 3:
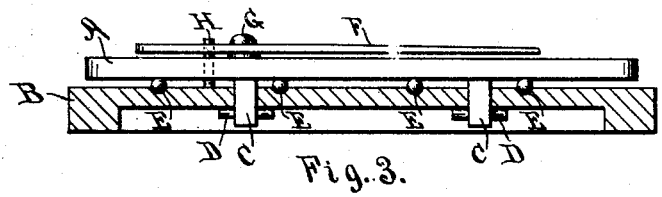

Figure 1 shows a plan view of my improved apparatus; Fig. 2, a longitudinal section on the line *x x* in Fig. 1, and Fig. 3 an end view with the base shown in section on the line *y y* in Fig. 2.

A represents the board, which is mounted to slide or reciprocate longitudinally on the base B, which latter is held stationary upon a table or the lap of the operator. In order to limit and determine the line of motion of the board, guide-blocks C are attached to the under side thereof and pass through slots provided therefor in the base B. These guide-blocks are provided with the pins D where they project below the slots, whereby the board is held in proper position above the base and prevented from tilting thereon. At each side of the guide-blocks are series of balls E, mounted in grooved runways in the base, upon which balls the board rests. It will be seen that by reason of this construction the board is limited to longitudinal movement on the base and that it may be reciprocated thereon very easily by reason of the ball-bearings.

A pointer F is pivoted at G upon the top of the board A, and within certain arcs traversed by the outer end of said pointer are displayed the required letters, figures, words, &c. The pointer is extended on the opposite side of the pivotal point, where it is engaged by a pin H, which projects up from the base B through slots I and J in the pointer and the board, whereby as the board is reciprocated from side to side the pointer is made to traverse the lettered and figured arcs.

In operating the apparatus the operator will place himself at one end of the base, with the fingers of both hands resting upon one end of the board A, or if there are two operators they will place themselves opposite one another, with their hands resting upon the opposite ends of the board. The board will then be moved by the involuntary action of the hands in a direction to or from the operator or operators, and the pointer under such influences will be caused to traverse the arcs and pause over the letters, figures, words, &c., which such actions of the hands would seem to point out.

Having thus described my improvements, and without limiting myself to the precise construction and arrangement of the parts as shown, what I claim as my invention, and desire to secure by Letters Patent, is—

1. An apparatus of the character described comprising a board with letters, signs or figures displayed thereon in concentric curves, a base upon which said board is mounted to reciprocate, a pointer pivoted above the board at the center of said curves, and connections between said pointer and base, whereby the pointer will be oscillated by the reciprocating movements of the board.

2. An apparatus of the character described comprising a board with letters, signs or figures displayed thereon in concentric curves, a stationary base, guides depending from the board through slots in the base whereby the board is restricted to a reciprocating motion on the base, ball-bearings between the board and the base, means for holding the board upon said bearings, a pointer pivoted above the board at the center of said curves, and connections between said pointer and base, whereby the pointer will be oscillated by the reciprocating movements of the board.

3. An apparatus of the character described comprising a board with letters, signs or figures displayed thereon in concentric curves, a stationary base upon which said board is mounted to reciprocate, a slotted pointer pivoted on the board at the center of said curves, and a pin projecting from the base through a slot in the board and engaging the slot in the pointer whereby the pointer is oscillated in conformity with the reciprocations of the board.

In testimony whereof I have affixed my signature in presence of two witnesses.

JEREMIAH B. RANDALL.

Witnesses:
 EDWIN E. GRADY,
 CARLTON H. WILBOR.